Oct. 27, 1925. 1,558,613
J. HOLLAND-LETZ ET AL
CUTTING AND GRINDING APPARATUS
Filed April 18, 1922 7 Sheets-Sheet 1

Oct. 27, 1925.

J. HOLLAND-LETZ ET AL

1,558,613

CUTTING AND GRINDING APPARATUS

Filed April 18, 1922

J. HOLLAND-LETZ ET AL 1,558,613

CUTTING AND GRINDING APPARATUS

Filed April 18, 1922     7 Sheets-Sheet 7

Fig. 20.

Witnesses:
Inventors:

Patented Oct. 27, 1925.

1,558,613

UNITED STATES PATENT OFFICE.

JOHN HOLLAND-LETZ AND LUDWIG HOLLAND-LETZ, OF CROWN POINT, INDIANA, ASSIGNORS TO THE LETZ MANUFACTURING COMPANY, OF CROWN POINT, INDIANA, A CORPORATION OF INDIANA.

CUTTING AND GRINDING APPARATUS.

Application filed April 18, 1922. Serial No. 555,486.

*To all whom it may concern:*

Be it known that we, JOHN HOLLAND-LETZ and LUDWIG HOLLAND-LETZ, citizens of the United States, and residents of Crown Point, in the county of Lake and State of Indiana, have invented certain new and useful Improvements in Cutting and Grinding Apparatus, of which the following is a specification.

Our invention is concerned with grinding and cutting machinery, and more especially with a device of the class described so constructed that it is adapted either to have a blower attached thereto to deliver ensilage to a silo, or a grinder, so that the cut up roughage may be further ground, by itself, or with the addition of small grain before grinding, so as to produce a balanced ration.

It is further concerned with a novel system of gearing interposed between the main shaft and one of the feed-roll shafts whereby, by adjusting the gearing, six different relative speeds of the cutter head and feed roll may be secured to cut three different lengths of feed for grinding and three other different and greater lengths of feed for ensilage.

It is further concerned with a novel mounting for the main cutter bar whereby it is easily and quickly removed for changing the operating edge, or for grinding, or for replacement.

To these ends, we employ certain novel combinations of elements adapted to be combined in different manners to produce different quantities of feed and to produce them at different speeds, all of which will be hereinafter fully described, and the novel features and combinations particularly pointed out in the claims.

To illustrate our invention, we annex hereto seven sheets of drawings, in which the same reference characters are used to designate identical parts in all the figures, of which,—

Fig. 2 is a side elevation of the same as seen from the lower side of Fig. 1, but with the belt pulley removed;

Fig. 14 is a central vertical section on the line 14—14 of Fig. 1;

Fig. 14$^a$ is a fragmentary detail in section on the line 14$^a$—14$^a$ of Fig. 3;

Fig. 14$^b$ is a section, on a larger scale, on the line 14$^b$—14$^b$ of Fig. 14$^a$;

Figures 1, 9, 10:
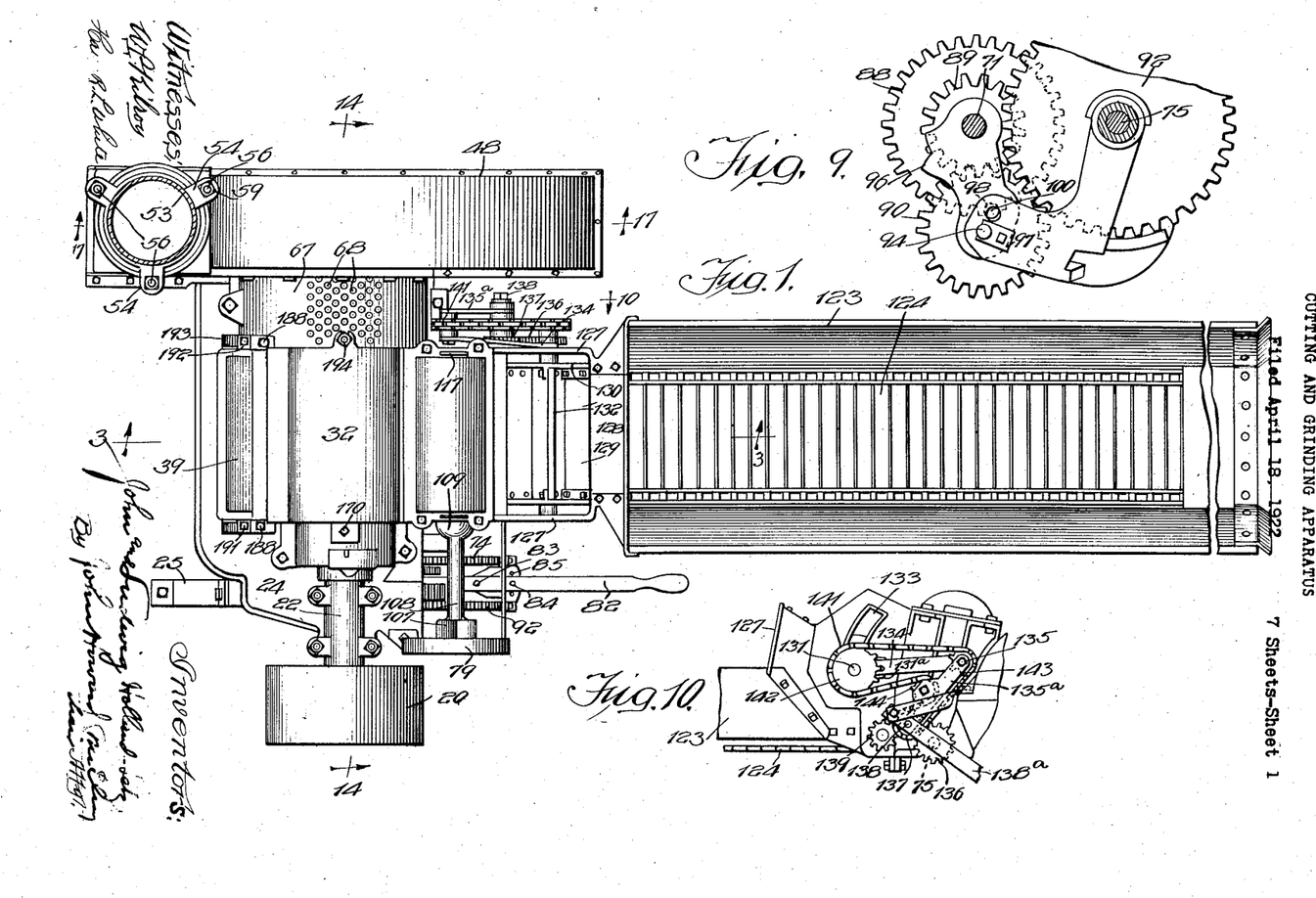
Fig. 1 is a top plan view of our apparatus with the blower attached.
Fig. 9 (Sheet 1) is a view similar to Fig. 7, but with the gearing adjusted as in Fig. 8.
Fig. 10 is a view in elevation on the line 10—10 of Fig. 1.
Figures 3, 4, 5, 6:
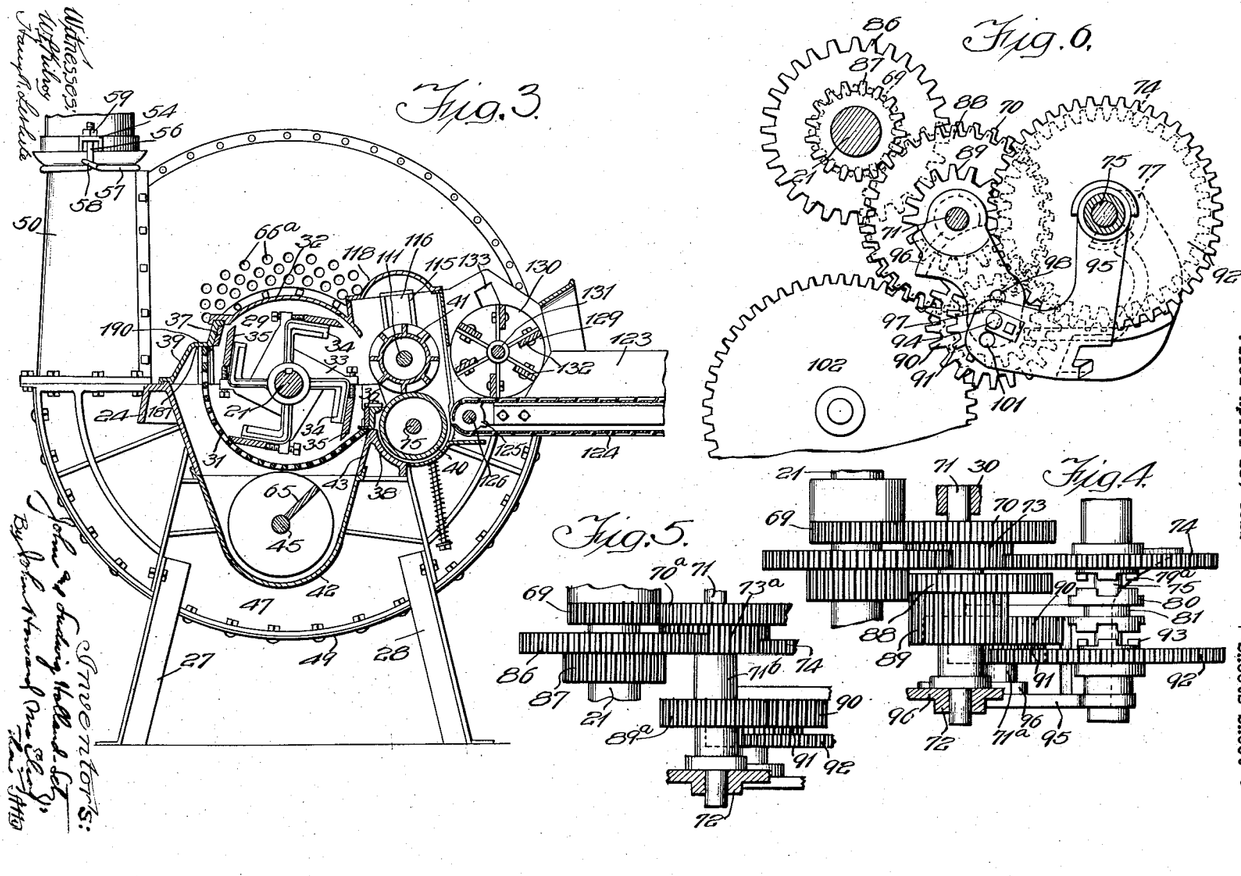
Fig. 3 is a side elevation in section on the line 3—3 of Fig. 1.
Fig. 4 is a top plan view of a portion of the gearing detached from its associated parts and adjusted for the slowest feed as used in grinding.
Fig. 5 is a similar view of a portion of the same gearing, but with a substituted pair of gears to substantially increase the rate of feed when used for cutting ensilage.
Fig. 6 is a side elevation of the same gearing shown in the same adjustment as in Fig. 4.
Figures 11, 13:
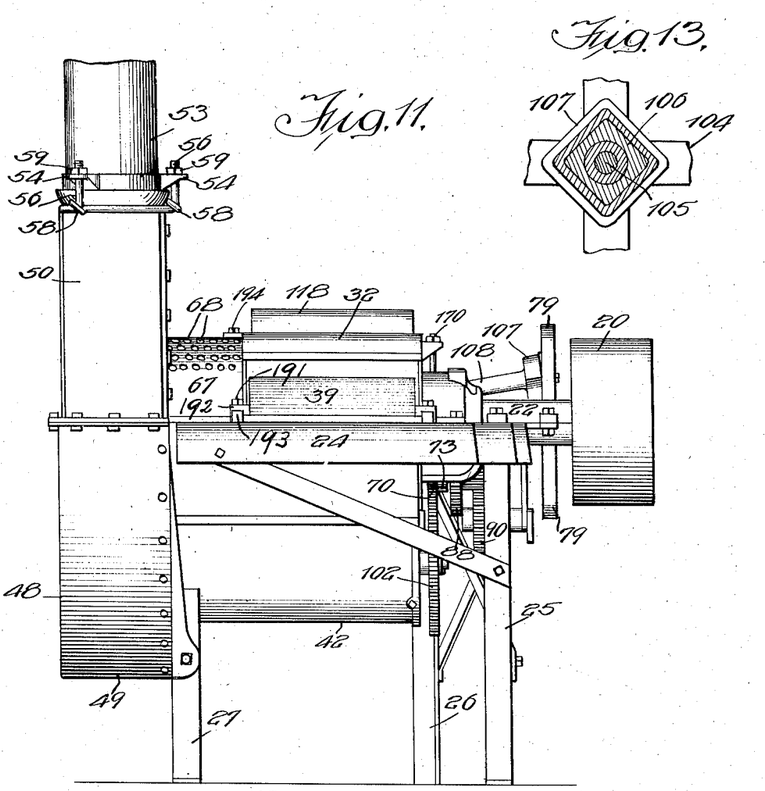
Fig. 11 is an end view.
Fig. 13 is a section on the line 13—13 of Fig. 12, but on a still larger scale.
Figures 14, 14A, 14B:
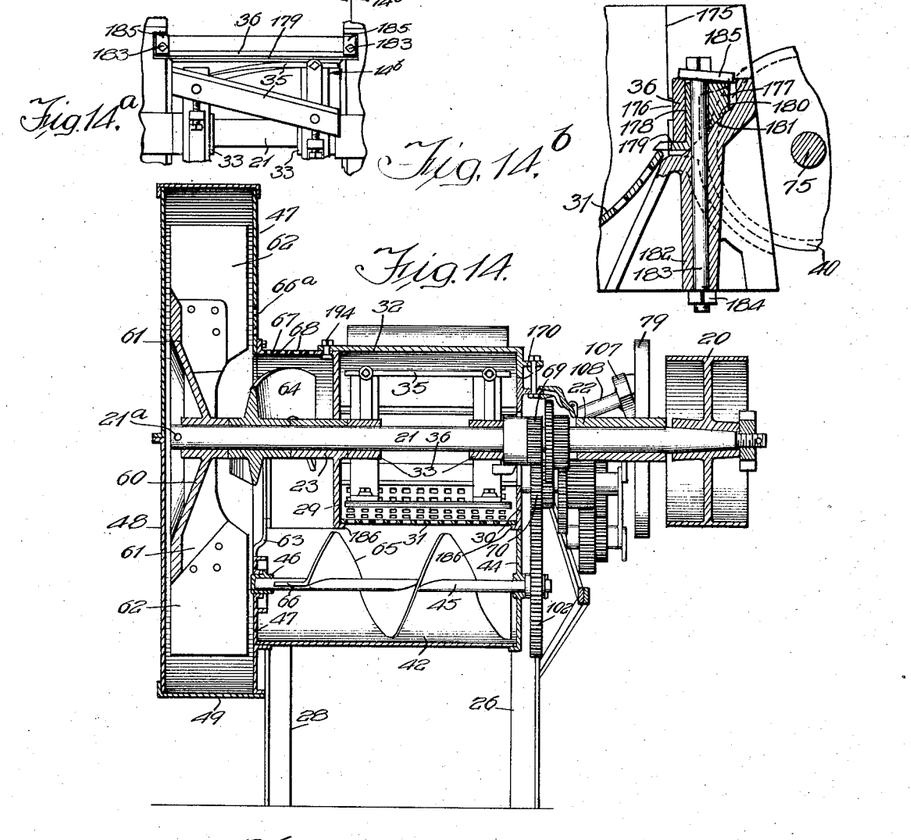

Referring first to Figs. 1, 11 and 14, it will be seen that we apply power to the machine by means of the belt wheel 20 which is secured on the end of the shaft 21, which is journaled in the elongated bearings 22 and 23, the bearing 22 being supported on the end of the main frame casting 24, which is supported from the legs 25 and 26 secured thereto at the belt-wheel end and indirectly from the legs 27 and 28 at the other end of the machine. The bearing 23 is supported by the adjacent two-part end casting 29 of the cutter-head casing, which casing has its ends formed of the casting 29 and the opposed two-part end casting 30, the lower half being formed by the perforated curved plate 31, while the top is formed by the curved casting 32. As best seen in Figs. 3 and 14, the shaft 21 has secured thereon, inside of the cutter-head casing, the pair of end castings or spiders 33, each having the four L-shaped arms 34, on the peripheral portions of which are secured and adjusted the four shearing blades 35. As the details of the adjustment of these shearing blades form no part of our present invention, they need not be further described, only that it will be understood that these blades 35 are adjusted so that their cutting edges co-operate with the cutter bars 36 and 37 suitably supported in the casing, the blade 36 being secured to the cross-bar casting 38, while the blade 37 is secured to the casting 39 forming part of the framework. It will be understood that any material fed into the cutter head by the feed rolls 40 and 41 will be sheared off into short pieces as it passes over the cutter bar 36, the length of the pieces, of course, depending upon the relative diameter and speed of rotation of the feed rolls and the number of the shearing blades 35 on the cutter head and the speed of the shaft 21 on which it is secured.

Figure 15:
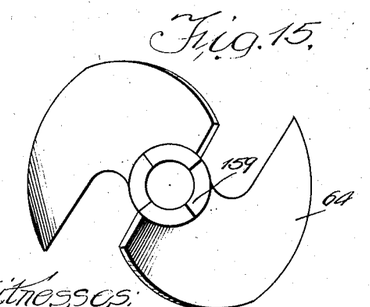
Figs. 15 and 16 are end and side elevations, respectively, of a lifting screw.
Figure 19:
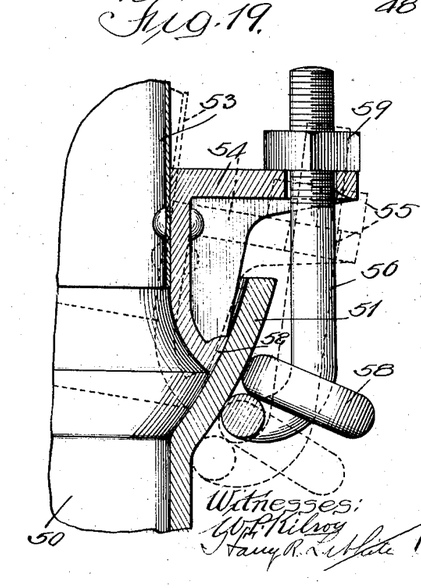
Fig. 19 is a detail in section on the line 19—19 of Fig. 18, but on a still larger scale.
Figure 20:
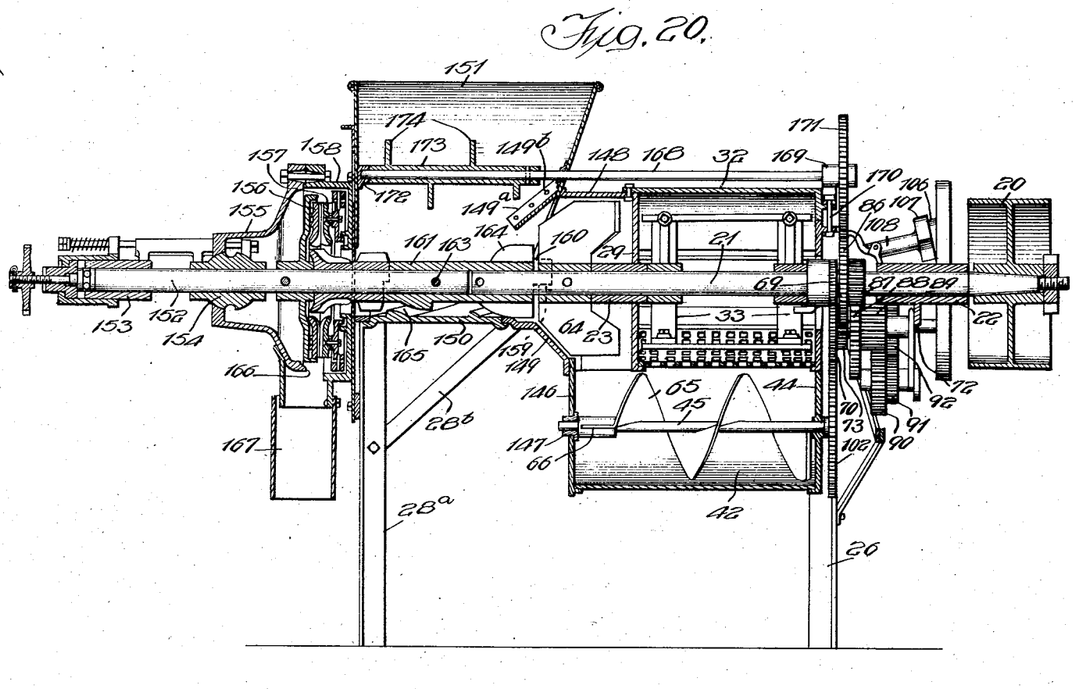
Fig. 20 is a section similar to Fig. 14, but illustrating the machine with the grinding mechanism substituted for the blower shown in the other figures.

The short pieces sheared off by the blades 35, if they are initially cut to the right length, drop through the perforations in the plate 31 into the conveyor trough 42 formed of a casting generally U-shaped in cross section, as seen in Fig. 3, and overlapping on one side the adjacent flange of the casting 24 and on the other side the adjacent flange of the casting 43. The trough is closed at the belt-wheel end by the casting 44, in which is journaled one end of the conveyor shaft 45, the other end of which is journaled in the bearing 46 located in the inner face 47 of the fan-wheel casing, which inner face of the fan-wheel casing forms the adjacent end of the conveyor trough 42. The conveyor shaft 45 is rotated from the main shaft 21 by a portion of a train of gearing which we will describe later on. The fan casing has the front side 48 and the peripheral portion 49, the legs 27 and 28 being secured to the side 47, as best seen in Fig. 3. The fan casing has the tangential portion 50, which is preferably a separate casting and terminates in the flange 51, the inner surface of which constitutes the portion of a concave, spherical surface adapted to co-operate with the correspondingly shaped peripheral portion of the generally tubular but flaring flange 52, in the upper end of which is riveted the blower pipe 53. While when the pipe 53 is vertical, its weight holds it in position, but as a convenient mechanism for securing this blower pipe 53 at any desired angle relative to the tangential portion 50 within its possible limits of adjustment, as seen in dotted lines in Figs. 17 and 19, we employ the novel connections best shown in Figs. 1, 2, 18 and 19, where it will be seen that the casting 52 has the three radial projections or ears 54, each of which has an aperture 55 through which passes the threaded upturned end 56 of the connecting rod, which consists of said upturned portion 56, the curved horizontal portion 57 and the hook 58, in which fits the vertical portion 56 of the adjacent rod. The nuts 59 screwed on the threaded end 56 and co-operating with the ears 54 serves to hold the connecting rods 57 in any desired relative position in which they may be placed to secure the desired angle of the pipe 53 to the tangential portion 50. In this arrangement of the machine, the shaft 21 has secured on its outer end by a pin passed through the aperture 21ª the generally circular casting 60, which has the conical surface shown, with the six attaching lugs 61 extending therefrom, and to which lugs 61 are riveted the impelling blades 62, which are rotated at such a speed that the ensilage coming into the fan casing is sucked in and propelled thereby through the tangential portion 50 and the pipe 53 to the silo or other receptacle into which the pipe 53 discharges. The inner portion 47 of the fan casing has an aperture 63 therein, in which rotates the screw 64, which is secured on the shaft 21 between the bearing 23 and the hub of the fan casting 60, and receives the ensilage delivered to it by the conveyor screw 65 secured on the shaft 45, which screw terminates in the radially extending portion 66, which lifts the ensilage when it has reached that end of the trough 42 above the level of the bottom of the opening 63 through which it is carried to the fan by the screw 64. This screw, illustrated in detail in Figs. 15 and 16, has the general shape of a perfect screw with one end tapered off to a cone, as seen in Fig. 20, to correspond to the shape of the casing with which it co-operates when it is used in connection with the grinding mechanism. This same tapered shape of the screw permits it being placed adjacent the center of the fan casing. The face 47 of the fan casing is provided with perforations 66ª, best seen in Fig. 2, and the cover casting 67, which is used when the fan casing is employed to connect the same with the cutter-head casing, is also provided with apertures 68, best seen in Fig. 1. These apertures 66ª and 68 are necessary to permit the entrance of the air to the fan casing, as of course the action of the blades 62 in forcing the ensilage out ductions, so that with this arrangement and the adjustments of the gears 90 and 91, as seen in Figs. 6, 9 and 7, we cut the ensilage three times as fast with the same speed of the shaft 21, and in lengths of ⅜, 9/16 and ¾ inches. Or instead of using the special gears 70ª, 73ª and 89ª, we might remove the gears 86 and 87, and connect the gears 73 and 88 by pins 88ª, as seen in Fig. 8, inserted in the hubs thereof, which would produce the same effect.

The wheel 70 also engages with the large spur gear wheel 102, seen in Fig. 14, which is secured on the shaft 45, and thus rotates this shaft at the proper rate to feed the cut material along the trough 42 to deliver the same to the fan.

Figure 12:
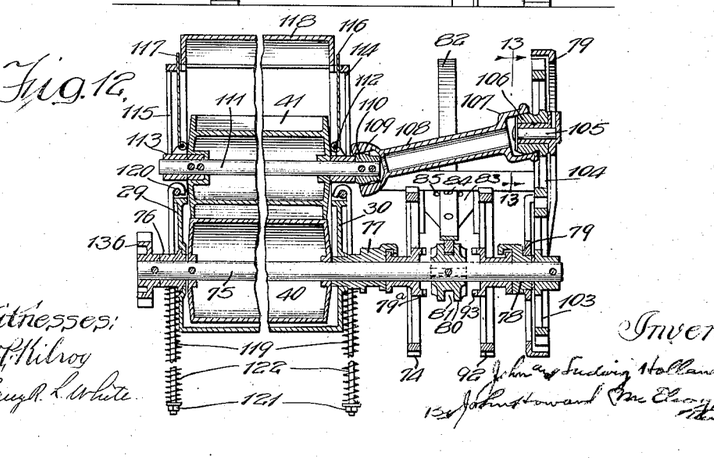
Fig. 12 is a section on the line 12—12 of Fig. 2, but on a larger scale.

The shaft 75 of the lower feed roll 40 has on its outer end the spur gear wheel 103, which meshes with the spur gear wheel 104 which is journaled on the stub shaft 105 supported from the casting 79, as best seen in Fig. 12, so that the wheel 104 rotates at the same speed as the wheel 103. The hub of the wheel 104 is provided with the portion 106, square in transverse cross-section, which is embraced by the enlarged cup-shaped end 107, square in internal cross-section, of the hollow shaft 108, thus forming a universal joint. The surface of the portion 106 has four rounded faces, seen in Fig. 13, to co-operate with the four sides of the end 107 so that while the shaft 108 is compelled to rotate with the wheel 104, it is free to swivel on its hub. The other end of this shaft 108 likewise has a cup-shaped portion 109, which is connected by a similar universal joint connection with the enlarged rounded-faced end 110 of the shaft 111 of the upper feed roll 41, which roll preferably is provided with the plurality of radial ribs to make the feed more positive than if a smooth perforated roller were employed. The shaft 111 is journaled in the pair of bearings 112 and 113 adapted to slide in the guideways 114 and 115 formed in the end pieces 30 and 29, respectively. To close these guideways, we preferably pivot on the upper sides of the bearings 112 and 113, the plates 116 and 117 which extend upward through the correspondingly shaped apertures in the ends of the top 118 of the feed-roller casing. With the connections shown, it will be obvious that the feed roller 41 can rise and fall as much as may be necessary to accommodate different kinds and amounts of material fed into the machine thereby and that the ends of the shaft 108 will telescope upon the flattened balls 106 and 110 as much as may be necessary to permit this movement, the weight of the shaft holding the cup shaped end 109 in the fullest possible engagement with the ball 110. To hold the upper roller 41 yieldingly down to its work, we provide the pair of rods 119 with hooks on their upper ends co-operating with eyes 120 carried by the bearings 112 and 113, and these rods 119 pass through apertures in lugs (not shown) projecting outwardly from the end pieces 29 and 30, and below these lugs and surrounding the rods 119 and co-operating with the abutments 121 on the ends thereof are the helically-coiled expanding springs 122 which hold the roller 41 yieldingly in contact with the roller 40.

Referring now to Figs. 1, 2, 3 and 10, it will be seen that we preferably provide a feed table 123, which preferably takes the form of a trough, in the bottom of which runs the feed belt 124, over sprocket wheels (not shown) at the outer end, and over a pair of sprocket wheels 125 at the inner end secured upon the shaft 126, which is journaled in the arms 127 carried by the casting 128, which forms a receiving funnel, as it were, for the material carried inward by the belt and beneath the feeding drum 129, which is preferably formed of a pair of disks 130 secured on the shaft 131 and connected by the six blades 132. This shaft 131 is journaled in bearings 131ª sliding in a pair of curved slots 133 formed in the arms 127, and the adjacent bearing 131ª is adjustably secured on the outer end of the arm 134, the inner end of which, as seen in Fig. 10, is pivoted on the stub shaft 135 supported from the arm 135ª pivoted at its other end on the stub shaft 138 supported at its outer end by the brace bar 138ª. The shaft 75, as seen in Figs. 10 and 12, has on its inner end the spur gear wheel 136, which meshes with the small spur gear wheel 137 journaled on the stub shaft 138, and which in turn meshes with the spur gear wheel 139 secured on the end of the shaft 126 to drive the feed belt. The spur gear wheel 137 has rigidly secured thereto or formed integrally therewith a sprocket pinion 140, about which extends the sprocket chain 141, which engages the sprocket wheel 142 secured on the adjacent end of the shaft 131, and passing over a pair of guiding sprocket pinions 143 and 144 mounted on the stub shafts 135 and 145, respectively. With the gearing thus described, it will be obvious that the feed belt will be rotated at the proper rate to carry the material to be cut to the feed rolls 40 and 41 irrespective of the rate at which said feed rolls are run, and it will be obvious also that the feeding drum 129 will operate at the same peripheral velocity as the feed belt, and is free to rise and fall as may be necessary to accommodate itself to the different kinds and amounts of material fed.

In Fig. 20, we have illustrated our invention as equipped with a grinding mechanism, and when this equipment is to be used, the fan casing 47 and the cover casting 67 are removed, and the end of the trough 42 is closed by the casting 146 which also creates a current of air, which assists in this operation.

Referring now to Figs. 1 and 3 to 6 inclusive, the operative train of gearing starts with the spur gear pinion 69 secured on the shaft 21, which meshes with the large gear 70 of the double spur gear wheel journaled on the stub shaft 71 supported between the end casting 30 and the bracket 72, the small gear 73 rigidly secured to the gear 70 in turn meshing with the spur gear wheel 74 which is loosely mounted on the shaft 75 of the lower feed roll 40. This shaft 75, as seen in Fig. 12, is journaled at its inner end in the bearing 76 secured in the end plate 29, and is journaled at its central portion in the bearing 77 supported partly by the end plate 30, while it is journaled at its outer end in the bearing 78 supported partly from the bracket 79, which is bolted to the end of the main casting 24. This wheel 74, as seen in Fig. 12, is held from longitudinal movement on the shaft and is provided with the clutch teeth 79ª adapted to be engaged by the adjacent teeth of the double clutch sleeve 80, which is splined on the shaft 75 and is provided with the customary annular channel 81 to co-operate with the yoke of the shifting lever 82, seen in Figs. 1, 2 and 12 as fulcrumed on the bracket at 83, so that it can be held in one of three positions, preferably by the hole 84 in the lever 82 co-operating with one of the three lugs 85 on the sector over which it swings. When the lever 82 is shifted to clutch the wheel 74 to the shaft 75, the latter is rotated rapidly backward, as is desirable in case the feeding mechanism becomes jammed, or in case the operator's hand or some implement be accidentally caught therein.

The smaller spur gear wheel 73 also meshes with the larger spur gear wheel 86 rigidly secured to the smaller spur gear wheel 87, which spur gear wheels are loosely journaled on the shaft 21. The smaller spur gear wheel 87 in turn meshes with the larger spur gear wheel 88 which is rigidly secured to the smaller spur gear wheel 89, the wheels 88 and 89 being loosely journaled on the shaft 71. The spur gear wheel 89 meshes with the larger one 90 of a pair of spur gear wheels rigidly secured together, the smaller one 91 meshes with the larger spur gear wheel 92 also loosely mounted on the shaft 75 but held from longitudinal movement thereon, as seen in Fig. 12. The spur gear wheel 92 is provided with the clutch teeth 93 on its hub which engage with the adjacent clutch teeth of the clutch collar 80 when the lever 82 is swung in that direction, and it will be noted that the speed of the wheel 92 is greatly reduced by the train of gearing, so that in rotating the feed shaft 75 in the forward direction, it rotates much more slowly than on the reverse effected by the wheel 74. This adjustment gives the lowest relative speed to the feed rolls and consequently with this arrangement the feed is cut as fine as possible preliminary to grinding it.

Figures 6, 7, 8:
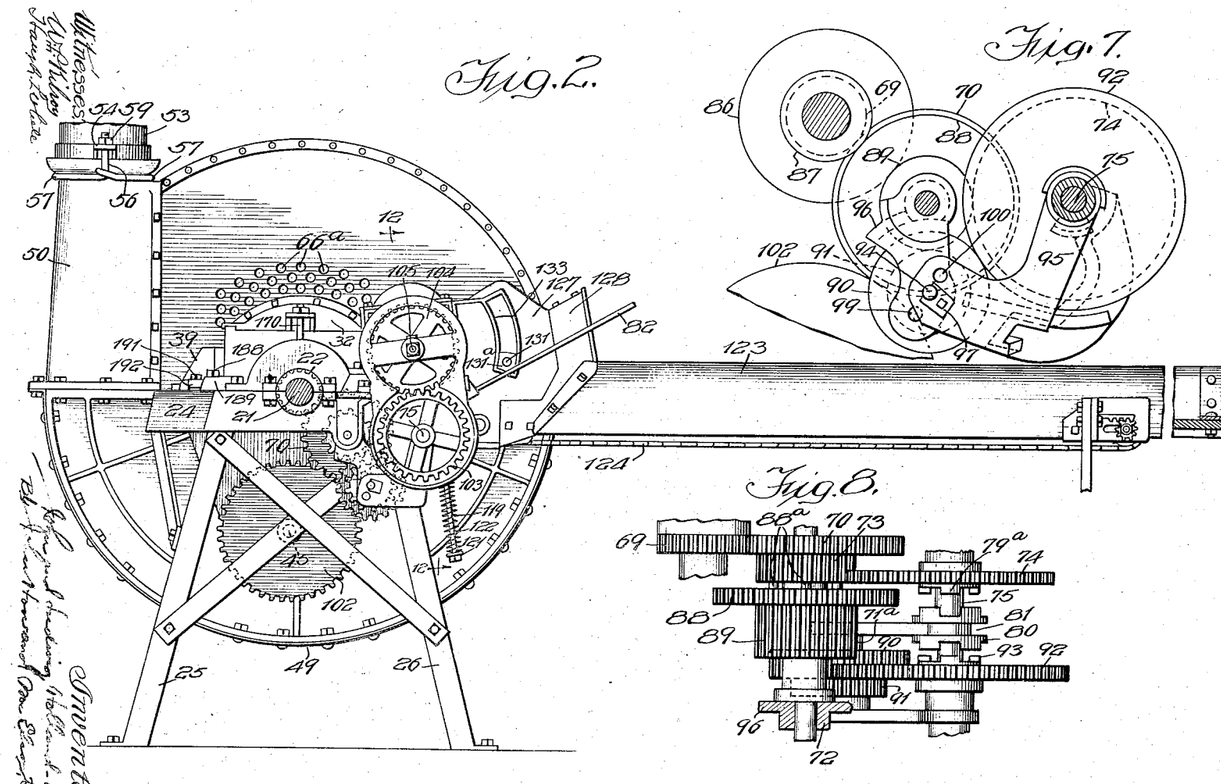
Fig. 7 (Sheet 2) is a diagrammatic view, similar to Fig. 5, but showing the gearing adjusted for a different speed, the fastest grinding feed.
Fig. 8 is a view of a part of the gearing shown in Fig. 4, but with the gearing adjusted for the intermediate grinding feed.

The wheels 90 and 91 are journaled on the bearing stud 94, which passes through apertures formed in the lower ends of the yoke 95 (which carries at its upper ends the bearings 77 and 78) and the arm 96, which are pivotally mounted at their upper ends on the shafts 75 and 71 respectively, in Fig. 6. The stud 94 has a detent notch therein, indicated in dotted lines in Fig. 6, adapted to be engaged by the recess in the end of the holding plate 97 bolted on the end of the arm 95. When it is desired to speed up the feed to the highest possible for grinding, this plate 97 is removed and the stud 94 withdrawn, and the wheels 90 and 91 are turned end for end, into the position shown in Fig. 7, in which the wheel 91 meshes with the wheel 89, and the wheel 90 meshes with the wheel 92, this cutting out one of the reductions and substituting therefor an increase and thus causing the machine to feed faster, and thus cut the material into longer lengths than otherwise occurs. As seen in Figs. 6 and 7 the arm 96 has a pair of apertures 98 and 99 therein, and the yoke 95 has a pair of apertures 100 and 101 therein, and when the wheels 90 and 91 are in the position shown in Figs. 4 and 6 the pin 94 has to pass through the apertures 100 and 99 respectively, whereas when they are reversed, as shown in Fig. 7, the pin 94 has to pass through the apertures 98 and 101 in order to bring the wheels into mesh. The arm 96 is held on the shaft 71 by a plate 97ª, similar to the plate 97, and co-operating with a recess in the end of the shaft.

If an intermediate speed is desired, we shift the collar 71ª from its position on the shaft 71 shown in Fig. 4 outside of the gear 91 to the position shown in Fig. 8 back of the gear 90, with the result that the gear 90 now meshes with both the gears 89 and 92, and becomes in effect an idle gear, merely transmitting the drive, without changing the speed, as the gear 91 meshes with nothing. In this arrangement, as seen in Fig. 9, the bearing pin 94 can be passed through either the apertures 98 and 100 or 99 and 101.

By these three adjustments, we can cut the material into ⅛th, ₃⁄₁₆ths or ¼ inch lengths before it passes to the grinder.

Where the apparatus is to be used for cutting ensilage and not for grinding, it is desirable to feed faster to cut the material into longer lengths, and for this purpose we provide the special gears 70ª, 73ª and 89ª fast on a common hub 71ᵇ, and substitute them for the gears 70, 73, 88 and 89 on the shaft 71, as seen in Fig. 5. This cuts out the gears 86, 87 and 88, and two of the rehas the bearing 147 for the adjacent end of the shaft 45. The place of the cover casting 67 is taken by the casting 148, which extends down to the horizontal plane of the shaft 21 and is connected to the cutter frame 149 which has the truncated conical portion 149ᶜ, which extends up to the shaft 21, and its place above the shaft is taken by the sheet metal cross piece 149ᵃ, extending across the hopper and having its upturned ends 149ᵇ secured thereto. The screw 64 has been previously described as being a section of a true helical conveyor screw, but with one end thereof tapered off for the purpose of co-operating with this truncated conical internal portion 149ᶜ of the casting 149, as, in the operation of this arrangement, the cut material has to be forced by the screw up through the lower part of the opening formed by the open end of this truncated portion, which opens into the concave formed by the safety bottom 150, which is secured by wooden pins (not shown) to the casting 149 which in turn has the hopper 151 secured on the upper portion thereof. The cross-piece 149ᵃ serves to deflect grain at that end of the hopper forward so it will have little tendency to fall back through the opening into the trough 42 when in operation. The place of the legs 27 and 28 is taken by a corresponding pair of legs, one of which, 28ᵃ, is shown as secured to the frame casting 149 and is again connected by the brace rod 28ᵇ with the casting 149. The shaft 21 is extended by the shaft 152, which is mounted in the customary bearings 153 and 154 supported from the end cover casting 155 of the burr casing. This shaft is furnished with the customary bearings and means for longitudinal adjustment, so that the rotating burr 156 may be kept at the proper distance from the stationary burr 157, which is mounted in the customary trammels, which are supported by the burr-casing casting 158, which in turn is connected to the end of the hopper 151. The hub of the outer end of the screw 64 is provided with the pair of opposed clutch recesses 159, which are adapted to co-operate with the corresponding lugs 160 on the end of the sleeve 161, which is pinned to the inner end of the shaft 152, as seen at 163. This loose connection between the screw 64 pinned on the shaft 21, and the sleeve 161 pinned on the shaft 152 compels the two shafts to rotate together, while permitting the longitudinal movement of the shaft 152 necessary for the adjustment of the burr 156 to regulate the fineness of the grinding. This sleeve 161 is provided with the customary feeding and crushing lugs 164 co-operating with the ribs 165 on the inner surface of the safety bottom 150 of the concave so as to feed the material through the concave and into the burr casing, where it will be ground between the burrs and drop out through the discharge aperture 166 and into the discharge spout 167. We preferably provide a stirrer shaft 168, journaled at one end in a bearing 169 which is held in place by the bolt and nut 170 which normally fasten the cover casting 32 to the end casting 30. A spur gear wheel 171 is secured on the outer end of this shaft and meshes with the spur gear wheel 86 previously described. The shaft 168 has bearings where it passes through the adjacent end of the hopper 151, and another bearing 172 secured on the outer end of the hopper. Secured on the shaft 168 within the hopper is the sleeve 173, which is provided with a plurality of blades 174 extending radially therefrom and serving to stir up and prevent any clogging of the material which may be dumped into the hopper.

Figure 16:
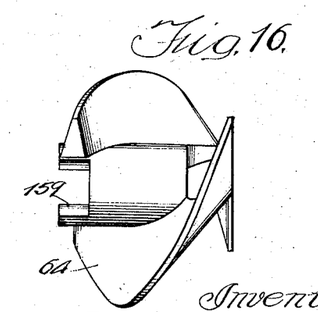
Figure 17:
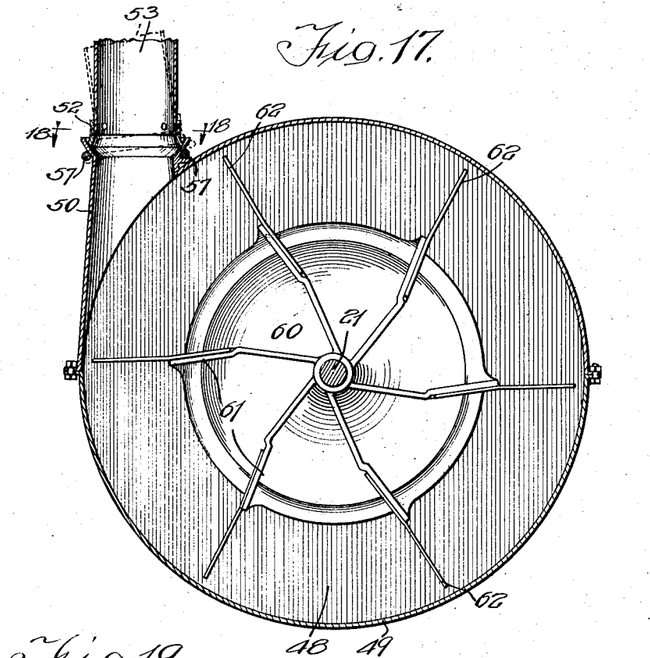
Fig. 17 is a view of the interior of the fan casing, as seen in section on the line 17—17 of Fig. 1.
Figure 18:
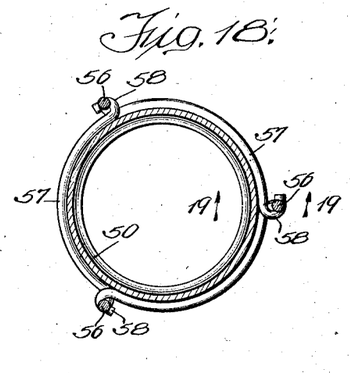
Fig. 18 is a detail in section on the line 18—18 of Fig. 17, but on a larger scale.

The operation of our complete apparatus will now be readily apparent. If it is to be used purely to cut ensilage, the arrangement shown in Figs. 1 to 15, inclusive, will be employed, and by means of the adjustments described, six different lengths of ensilage might be cut and delivered to any desired height by the fan mechanism described, although ordinarily only the three longer grades are so delivered. If the silage is to be ground further and mixed with grain, the arrangement shown in Fig. 16 is employed and the desired one of the three shorter lengths is secured by adjusting the gears 90 and 91, and whatever grain is desired to be mixed with the roughage is put into the hopper 151 and mixed therewith in the desired proportions, and the mixture is thoroughly ground between the burrs 156 and 157.

In Figs. 14ᵃ and 14ᵇ we show the preferred method of securing the cutter bar 36 in place. The casting 24 at the feed roller side has the offsets 175 provided with bearing lugs 176 against which the ends of the cutter bar 36 are held. The bar 36 is supported throughout its length by the bar 177 having the vertical face 178 and the horizontal flange 179, and on its rear side at the ends the inclined surfaces 180 co-operating with the correspondingly inclined faces 181 on the frame casting 24 at the bottom of the offsets 175. Extending downward beneath these surfaces are the tubular lugs 182, through which extend the bolts 183, which also pass through the registering apertures in the ends of the bar 177, so that when the nuts 184 are tightened up, the heads of the bolts acting on the clamping or equalizing plates 185 through which they pass, and which have their ends resting on the top of the cutter bar 36 and on the rear edges of the bar 177, serve to clamp the cutter bar 36 securely in place. By removing the cover 32 and the nuts 184, the cutter bar 36 can be easily gotten at and removed or replaced. This method of mounting it enables us to use for the cutter bar 36 a plain rectangular bar which is ground to have a shearing edge at each of its four longitudinal edges, so that by changing them, the bar can be used for a long time without any grinding. By reason of the inclined surfaces 180 and 181, the bar 177 is forced downward and forward by the downward pressure of the cutter bar 36 thereon, and this reacts to clamp the cutter bar 36 firmly against the lugs 176.

Referring to Figs. 1, 2, 3, 11 and 14, it will be seen that we have a novel combination of elements by which the screen plate 31 is secured in place. The side walls in the cutter casing cast integral with the frame 24 below the shaft 21 and the ends of the casting 39 have a channel groove formed on the inner faces thereof to correspond with the offset of step 186, shaped in its general outline like the outer surface of the ends of the screen plate 31, which ends rest on said offset 186, as best seen in Fig. 14, where said offset or step appears as if it were a flange because it there approaches so closely to the bottom of the ends in the casting 24. The rear edge of the screen plate 31 abuts against the under side of the horizontal flange 179 and its front end is engaged by the under side of the horizontal portion 187 of the casing casting 39 when the latter is bolted down on the casting 24 by the bolts 188 passing through the ears 189 on the ends of the casting 39 and into the casting 24. The ribs 190 (see Fig. 3) projecting inwardly from the inner faces of the ends of the casting 39 and forming a channel therein prevent the adjacent edge of the screen plate from possibly springing inwardly and getting into the path of the knives 35. When it is desired to remove the screen plate 31, it will be obvious that it can be easily done by removing the bolts 191 (see Fig. 2), holding the wedge blocks 192 between the ears 189 and the lugs 193 on the casting 24, after which the bolts 188 are removed. The cover piece 132 has been previously removed by loosening the bolts and nuts 170 and 194 (see Figs. 1, 2, 11 and 14) so that the casting 39 can be removed and the screen plate lifted out to be cleaned or replaced. In some work, such as cutting ensilage, we prefer to remove the screen plate 31 entirely so as to secure a greater capacity.

While we have shown and described our invention as embodied in the form which we at present consider best adapted to carry out its purposes, it will be understood that it is capable of modifications, and that we do not desire to be limited in the interpretation of the following claims except as may be necessitated by the state of the prior art.

What we claim as new, and desire to secure by Letters Patent of the United States, is:

1. In a cutting and delivering device, the combination with a casing, of a shaft journaled therein, a comminuting head on the shaft, a delivery fan on the shaft, a fan casing having an inlet above the axis of the hereinafter mentioned screw conveyor, a trough beneath the shaft into which the material cut by the head falls, a screw conveyor in the trough, and a lifting element on the end of the screw conveyor to lift the material to the fan-casing inlet.

2. In a cutting and delivering device, the combination with a casing, of a shaft journaled therein, a comminuting head on the shaft, a delivery fan on the shaft, a fan casing having an inlet above the axis of the hereinafter mentioned screw conveyor, a trough beneath the shaft into which the material cut by the head falls, a screw conveyor in the trough, a lifting element on the end of the screw conveyor to lift the material to the fan-casing inlet, and a conveying element on the shaft to carry the material into the fan casing.

3. In a cutting device, the combination with a casing, of a shaft journaled therein, a comminuting head on the shaft, a trough beneath the shaft into which the cut material falls, a conveyor in the trough, said casing having a portion surrounding an outlet from the casing, and said portion along its interior being shaped like the surface of a truncated cone and concentric with the shaft, a screw on the shaft having the end of a helix cut off to cooperate with the inner surface of said outlet portion, and means to lift the material from the trough to the screw.

4. In a cutting and grinding device, the combination with a casing having a shaft journaled therein, of means for driving the shaft, a comminuting head on the shaft, feeding means to the head, a trough beneath the head adapted to receive the cut material, a fan casing removably attached to the end of the main casing and the trough, a fan attached to the shaft, and means for feeding and lifting the cut material from the trough into the inlet of the fan casing, said inlet being located above the body of the trough.

5. In a device of the class described, the combination with a cutter-head casing having engaging surfaces at the ends thereof adjacent the path of the rotating cutting edges and bolt holes therein below and to the rear of the engaging surfaces, of a supporting bar having a longitudinal seat in the front thereof, a cutter bar on said seat and contacting at its ends with the engaging surfaces, bolts having enlarged heads resting on the upper edges of the cutter bar and on adjacent surfaces on the supporting bar, and nuts to draw the bolts downward to clamp the cutter bar between the engaging surfaces and the supporting bar.

6. In a device of the class described, the combination with a cutter-head casing having engaging surfaces at the ends thereof adjacent the path of the rotating cutting edges and bolt holes therein below and to the rear of the engaging surfaces, of a supporting bar having a longitudinal seat in the front thereof, a cutter bar on said seat and contacting at its ends with the engaging surfaces, bolts having heads passing through said bolt holes, equalizer plates resting on the upper edges of the cutter bar and on adjacent surfaces of the supporting bar engaged by the bolt heads, and nuts to draw the bolts downward to clamp the cutter bar between the engaging surfaces and the supporting bar, said casing and the ends of the supporting bar having complementary co-operating inclined surfaces to force the cutter bar against the engaging surfaces on the casing as the bolts are tightened.

7. In a device of the class described, the combination with a cutter-head casing having engaging surfaces at the ends thereof adjacent the path of the rotating cutting edges and bolt holes therein below and to the rear of the engaging surfaces, of a supporting bar having a longitudinal seat on the front thereof, a cutter bar on said seat and contacting at its ends with the engaging surfaces, equalizer plates resting on the upper edges of the cutter bar and on adjacent surfaces of the supporting bar, bolts passed through said equalizer plates, and nuts to draw the bolts downward to clamp the cutter bar between the engaging surfaces and the supporting bar.

8. In a device of the class described, the combination with a cutter-head casing having engaging surfaces at the ends thereof adjacent the path of the rotating cutting edges and bolt holes therein below and to the rear of the engaging surfaces, of a supporting bar having a longitudinal seat on the front thereof, a cutter bar on said seat and contacting at its ends with the engaging surfaces, equalizer plates resting on the upper edges of the cutter bar and on adjacent surfaces of the supporting bar, bolts passed through said equalizer plates, and nuts to draw the bolts downward to clamp the cutter bar between the engaging surfaces and the supporting bar, said casing and the ends of the supporting bar having complementary co-operating inclined surfaces to force the cutter bar against the engaging surfaces on the casing as the bolts are tightened.

In witness whereof, we have hereunto set our hands, this 13 day of April, 1922.

JOHN HOLLAND-LETZ.
LUDWIG HOLLAND-LETZ.